Feb. 1, 1966

C. D. BOCK ETAL
3,232,122
INERTIAL PLATFORMS

Filed June 2, 1961

CHARLES D. BOCK
ALFRED KRELL
DONATO MASUCCI
INVENTORS.

BY

ATTORNEY.

CHARLES D. BOCK
ALFRED KRELL
DONATO MASUCCI
INVENTORS.

BY Raymond A. Paquin

ATTORNEY.

Feb. 1, 1966 C. D. BOCK ETAL 3,232,122
INERTIAL PLATFORMS

Filed June 2, 1961 3 Sheets-Sheet 3

CHARLES D. BOCK
ALFRED KRELL
DONATO MASUCCI
INVENTORS.

BY
ATTORNEY.

United States Patent Office 3,232,122
Patented Feb. 1, 1966

3,232,122
INERTIAL PLATFORMS
Charles D. Bock, Plainview, Alfred Krell, North Bellmore, and Donato Masucci, North Roslyn Heights, N.Y., assignors to American Bosch Arma Corporation, a corporation of New York
Filed June 2, 1961, Ser. No. 114,448
9 Claims. (Cl. 74—5.34)

The present invention relates to stabilized platforms and has particular reference to platforms for inertial guidance navigation apparatus.

One type of inertial guidance of vehicles is accomplished through maintaining the axes of three orthogonally aligned accelerometers in constant attitude in space and interpreting the accelerometer indications into speed, distance and direction. The constant attitude of the accelerometer axes is assured by mounting the accelerometers on a gyro stabilized platform with their axes along the three orthogonal directions. Although the functional construction of the platform is fixed, the actual physical construction of such platforms may take many forms but of prime importance is the maximum utilization of space, i.e. minimum volume. Equally important is the provision for ease of initial alignment, accuracy of initial alignment, and ease of checking component accuracies prior to flight.

It is an object of this invention to provide a minimum size platform for the presently available components.

It is a further object of the invention to provide a platform which can be quickly and accurately aligned with respect to given reference.

It is yet another object of this invention to provide means for adjusting and calibrating platform components according to preferred directions and values.

Certain problem areas are eliminated by the present construction, these including wire twist between relatively rotated members and initial calibration of platform, for example, as will be made clear by the following description.

For a better understanding of the invention, reference can be made to the accompanying diagrams, in which FIGURE 1 represents a view of the platform and gimballing within its casing, FIGURE 2 is another view of the platform and gimballing looking in the direction of 2—2 of FIGURE 1.

FIGURE 5 is an illustration of an isolation mount, and

Figure 1:
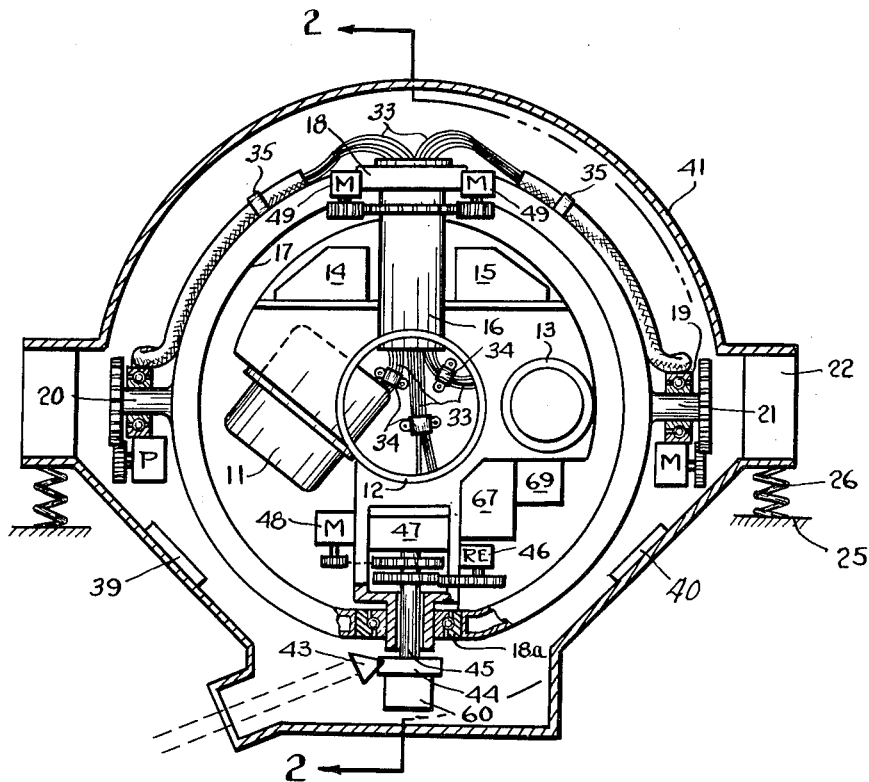

With reference now to FIGURE 1 the platform or azimuth gimbal 10 is a complex rigid casting which provides inflexible mounting surfaces for gyros, accelerometers, pendulums, and associated electronics. A platform of the type to be described may be used, for example, in the physical embodiment of the platform functionally shown and described in co-pending patent application SN 848,637 filed October 26, 1959, for "Platform Alignment" assigned to the assignee of this application and now Patent No. 3,143,893. In FIGURE 1, one gyro 11 is shown in place, while the other gyro which would normally be fixed in the mounting hole 12 has been removed to reveal the interior of the gimbal casting 10 through the mounting hole. The spin axis of the gryoscope such as 11 is perpendicular to its mounting flange so that the spin axis of gryoscope 11 is in the plane of FIGURE 1, tilted at an angle with respect to the horizontal, while the spin axis of a gyro when mounted in the hole 12 is perpendicular to the plane of the paper. To the right of hole 12, the X axis accelerometer 13, whose sensitive axis is normal to its mounting flange and in FIGURE 1 is normal to the plane of the paper, is seen. Thus the sensitive axis of accelerometer 13 is parallel to the spin axis of that gyroscope which is mounted in the hole 12. The electronics 14, 15 for this accelerometer 13 and one other not seen whose axis is normal to the axis of accelerometer 13 is mounted above the accelerometer 13. Located below accelerometer 13 are the zero setting and calibration electronics for all three accelerometers (two of which are not seen in FIGURE 1). The accelerometer 13 (and the others not yet described) are of the vibrating string type disclosed in co-pending application Serial No. 586,615, filed May 22, 1956.

The azimuth gimbal casting 10 includes a long hollow tube 16 which also serves as the shaft by which the upper end of gimbal 10 is journalled in bearing 18 in a roll gimbal frame 17. The lower end of gimbal 10 is journalled in the bearing 18a also carried by gimbal frame 17.

Figure 2:
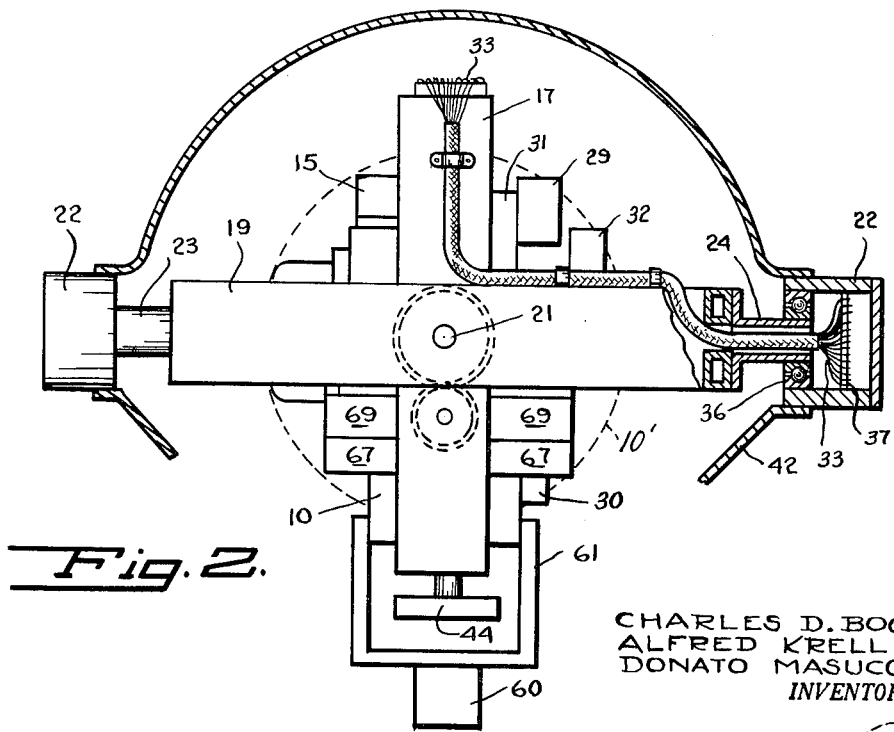

Roll gimbal frame 17 is supported in pitch gimbal ring 19 by shafts 20, 21, and gimbal ring 19 is mounted for rotation in support 22 by its hollow shafts 23, 24 (FIG. 2). The support 22 is attached to the vehicle body 25 by isolation mounts which are schematically illustrated in FIGURE 1 by the springs 26 and one of which is shown in FIGURE 5.

Figure 3:
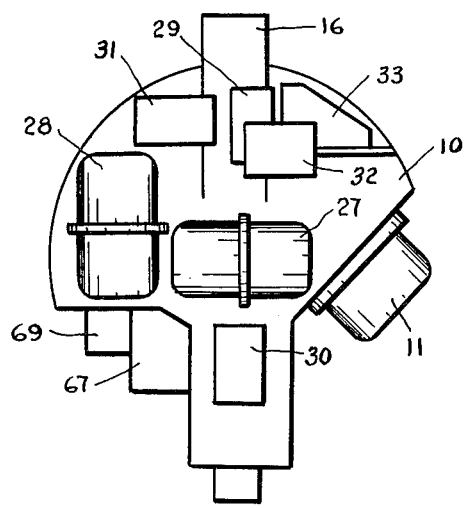
FIGURE 3 is another view of the platform alone.
Figure 4:
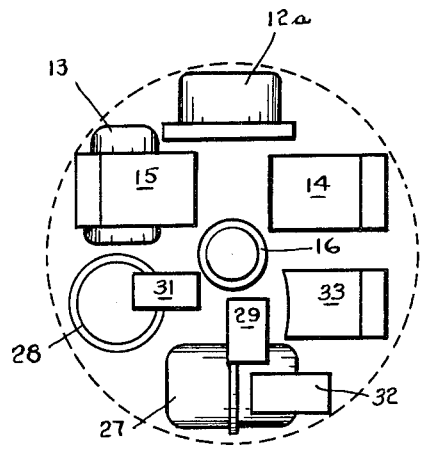
FIGURE 4 is a top view of the platform.

FIGURE 3 shows the other side of the platform or azimuth gimbal 10, i.e., the reverse of that shown in FIGURE 1. Observing the platform from this side the Y and Z accelerometers 27, 28 whose sensitive axes are in the plane of the paper of FIGURE 3 and are directed horizontally and vertically respectively are seen, as well as the four pendulums—X pendulum 29, Y pendulum 30, and the two Z pendulums 31 and 32. Also seen behind the Z pendulum 32 is the electronics package 33 for one of the accelerometers, e.g., 27 while the electronics 15, for the other accelerometer 28 is seen in FIGURE 1. FIGURE 4 shows the arrangement of components as viewed from the top of the platform 10. Gyro 12a in this figure fits into the cavity 12 of FIGURE 1.

It should be obvious that the components in FIGURES 1-4 are arranged in three dimensions, and that all items are enclosed in a substantially spherical volume rather than a single plane. This is indicated by the dotted circle 10' of FIGURE 2, which represents the azimuth gimbal 10 with all of the components mounted thereon as viewed from the right hand side of FIGURE 1. The physical arrangement having been explained, the particulars of invention will now be described.

A multitude of electrical wires 33 must be run from the vehicle structure 25 to the platform 10 to supply power to the components and to transmit the data detected by the various components (gyros, accelerometers, pendulums) to those devices (not shown) which make use of the intelligence to control the platform and to guide the vehicle to its destination, e.g., computers and auto pilot equipment.

Undisturbed rotation of platform 10 within the roll gimbal 17 through a considerable angle about each axis dictates that the resistance to rotation offered by the electrical wires 33 must be held to a minimum. For this purpose, the wires 33 are fed through the hollow shaft 16 and anchored to the platform 10 by clamps 34 near its geographical center. As the wires emerge from the top of shaft 16 they are fanned out in two portions one to the left and the other to the right and each portion is anchored to the roll gimbal 17, e.g., by clamps 35, leaving generous loops of wires near the shaft 16. The long length of wire between the clamps 34, 35 permits relatively large angular displacement between the gimbal frame 17 and platform 10 before the twisting of the wires 33 hinders the freedom of rotation. Similarly, large undisturbed angular deflections of pitch gimbal 19 with respect to the support 22 are made possible by feeding the electrical wires 33 through the hollow shafts 23, 24 and through the center of the bearings in which the shafts 23, 24 are journalled, one of which is shown at 36. Those portions of the wires 33 between clamps 35 and bearing 36 are run along the gimbal frame 17 to shafts 20, 21 across the gap to gimbal ring 19 and along the ring 19 to shafts 23, 24 and there through to support 22. The ends of the wires 33 are connected to terminals on terminal boards 37 to which electrical connections from the auxiliary apparatus (not shown) are also made.

It will be seen that in addition to providing the desired freedom of rotation, the procedure of feeding the wires 33 through the center of the bearings results in a small and symmetrical construction.

For proper operation of all the components they must be located in an environment of constant temperature. For this purpose, a temperature sensing transducer 39 and a heater winding 40 are enclosed within the hermetically sealed chamber formed by the upper and lower casings 41, 42 attached to frame 22. The device operates in an ambient temperature lower than the operating temperatures so that whenever the temperature inside the chamber drops below operating temperature, the sensor 39 produces an output voltage which causes energization of heating winding 40 to raise the temperature. When the temperature reaches the desired point, winding 40 is deenergized to prevent further heating of the platform.

The feature of the hollow shaft used to create a passageway for electrical wires through the center of the bearing or axis of rotation reduces wire "windup" which had formerly been eliminated by use of pigtail leads. The pigtail approach where a large quantity of wires is involved becomes cumbersome. Also, the wire length and hence the weight is considerably greater in the earlier arrangement. The free length of wire between the anchored positions on the relatively rotatable members e.g. between clamps 34, 35 must be chosen with consideration of the expected angular rotation. Thus, the distance between clamps 34, 35 is made long to permit large relative displacement between gimbals 10, 17 while the free length of the wires through bearing 36 can be shorter since only a small rotation is required about the axis through shafts 23, 24. It has been stated earlier that the acceleromters 13, 27, 28 are aligned with or parallel to orthogonal X, Y and Z axes respectively. For guidance purposes, the axes form a right handed set of axes with the X axis horizontal pointed in the direction of the destination, the Y axis horizontal and perpendicular to the X axis and the Z axis, which is perpendicular to both the X and Y axes, vertical.

Azimuth alignment, that is alignment of the X accelerometer in the chosen direction in azimuth, is accomplished just prior to launching with the air of an optical collimator (not shown) working in conjunction with a Porro prism 43. The direction of the collimator axis is accurately known. The Porro prism 43 is carried on a flange 44 on the lower end of shaft 45 which is journalled in the lower shaft of platform 10 to be coaxial with the lower bearing 18a. The upper end of shaft 45 is geared to a low speed position pickoff 46 and a high speed position pickoff 47 such as an inductosyn for example. The face of prism 43 is accurately displaced with respect to the axis of the X accelerometer by a servo motor 48 controlled by the pickoffs 46, 47 and a positional input signal in the usual manner associated with two speed servo positioning devices. The collimator light beam is focused on the prism and an angular error (in azimuth) between the incident and reflected beams creates an output signal at the collimator which is used to drive the entire platform 10 by motors 49 until the prism is exactly perpendicular to the collimator axis. Since the angle between the collimator axis and the desired azimuth is known, the platform 10 can be oriented so as to align the X accelerometer in any desired direction in accordance with the above method.

It has been assumed in the foregoing that the accelerometers are *exactly* orthogonal and are aligned *exactly* normal to the corresponding pendulums. (The X accelerometer reads acceleration in the X direction while the X pendulum registers tilt about the X axis.) However, this exact alignment is not necessarily obtained simply by mounting the components on surfaces which are assumed to be orthogonal. The existing error first must be measured and then compensated for in the guidance computer in order to guarantee reaching the destination within the prescribed allowable error. The errors in each component are determined before installation of the platform in the vehicle by successively placing the entire platform assembly in precisely orthogonal positions and observing the indications of the components when horizontally and vertically aligned. The sequence of these orthogonal relationships can be systematized to give the desired data with the minimum number of positions. The orthogonally related positions are set up as will be described in accordance with the following procedure.

After temporarily removing the lower casing cover 42, an optically reflecting, substantially perfect cube 60 is attached to the platform casting 10 by arms 61 (FIGURE 2) which depend therefrom to a point below the prism 43. The prism 43 is adjusted to the position where the angular measuring devices 46, 47 have no output, i.e., the zero position and all the gimbals and shafts of the apparatus of FIGURE 1 are locked in their normal positions. Since the prism 43 is locked to the platform 10, the cube 60 may alternately be carried by flange 44. The cube 60 is manually adjusted and locked so as to have one face parallel to prism 43 (within 30 minutes of arc or parallelism). The cube 60, therefore, has one face parallel to the axis of the X accelerometer, and the adjacent faces substantially perpendicular thereto.

Figure 6:
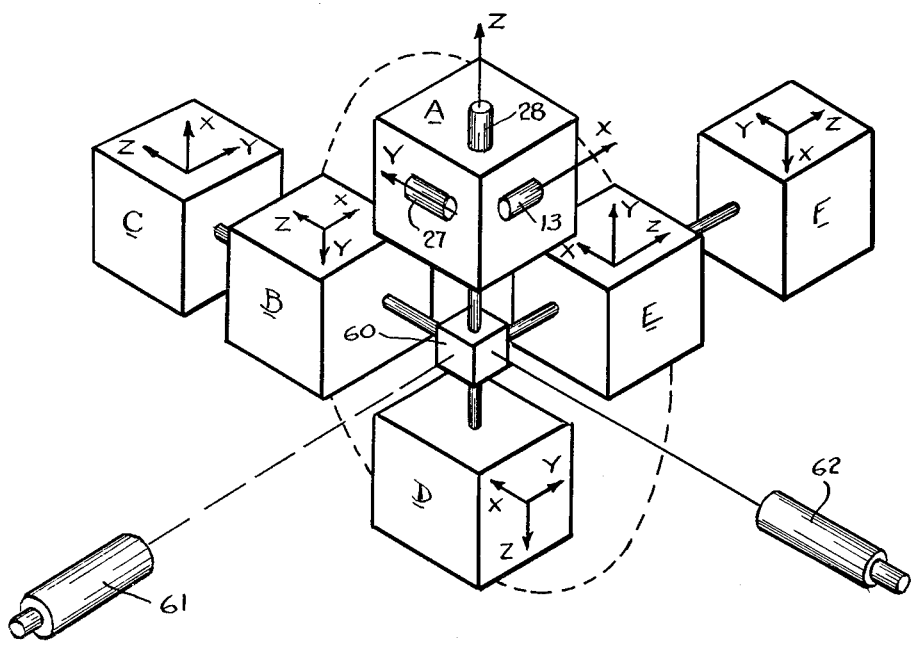
FIGURE 6 illustrates certain test positions of the platform.
Figure 8:
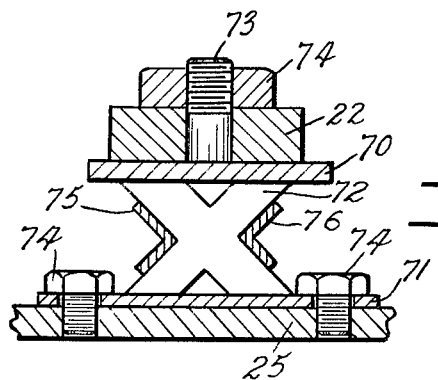

A pair of horizontal collimators, 61, 62 (see FIGURE 6) are trained on the cube 60 along with their lines of sight exactly at right angles with respect to each other and to the local gravity vector. If the position of the platform supporting ring is adjusted so that the cube faces are perpendicular to the collimator axes, the platform will be adjusted so that the X and Y accelerometers are nominally horizontal and the Z accelerometer is nominally vertical as in position A. The platform is then rotated about the X axis to the position B and later to successive positions C, D, E, F, by rotating the platform 90° about the Z, Y, X and Z axes respectively. At each position the indication of the X, Y, and Z accelerometers are read and recorded and nominally the accelerometer readings should be as follows:

| Position | A | B | C | D | E | F |
|---|---|---|---|---|---|---|
| Accel.: | | | | | | |
| X | 0 | 0 | +g | 0 | 0 | −g |
| Y | 0 | −g | 0 | 0 | +g | 0 |
| Z | +g | 0 | 0 | −g | 0 | 0 |

Readings other than these will provide a measure of the error of the accelerometers and are used to determine the corrections required due to scaling and zero setting of each accelerometer.

At the same time, the pendulums are calibrated and their zero offsets determined. This is accomplished by observing the pendulum outputs in selected ones of the positions A through F and then calculating the desired characteristics by usual mathematical methods.

When in possession of the calibration data of the accelerometers and pendulums the platform is ready to be moved out of the production shop into the field where the pendulums now become the primary horizontal references. The calibration and zero settings of the accelerometers are checked in the field to make sure they agree with the figures obtained in the shop. For any deviation therefrom, the zero setting and calibration potentiometers 67 are adjusted by remotely controlled motors 69, until the deviations are reduced to zero. Checking of the accelerometers calibration is accomplished by orienting the platform so as to put the accelerometers in a vertical position, one-by-one, as completely described in a co-pending patent application.

FIGURE 5 shows the isolation mount 26 of FIGURE 1 in detail. In this preferred construction the upper and lower plates 70, 71 of the mount are separated by and bonded to a resilient member 72 having a cross section resembling the letter X. The support 22 of the platform 10 is secured to the top plate 70, as by means of threaded stud 73—74 while the lower plate 71 is secured to the vehicle frame 25 by any convenient means such as screws 74 for example. The resilient mount is intended to filter out the high frequency vibrations experienced by the air frame 25 which are near the resonant frequencies of any of the components on platform 10. In order to modify the transmission characteristics of the mount to insure the filtering of correct frequencies, the resilient member 72 is sheathed at its center with metallic angular pieces 75, 76 which are bonded or otherwise intimately attached to the member 72 in the crotches between the plates 70 and 71. There is no loading member such as 75, 76 in the crotch facing the plate 70 nor in the crotch facing the plate 71. The dimensions of the metallic pieces 75, 76 are selected with consideration for the desired transmission characteristics of the mount.

We claim:

1. In a device for calibrating and adjusting the inertial guidance system for a vehicle, a support, a platform on said support, said platform normally supporting the sensitive elements of said guidance system in constant attitude in inertial space and including a rigid casting mounted in a gimbal system on said support and carrying said sesnitive elements thereon, a cube having optically reflecting surfaces mounted on said casting, a pair of optical collimators, on said support, said collimators being trained on adjacent faces of said cube whereby the output of said collimators represents the misalignment between the axes of said collimators and said sensitive elements.

2. In an inertial guidance system for a vehicle, a platform for supporting the sensitive elements thereof in constant attitude in inertial space including a rigid casting mounted in a gimbal system on said vehicle and carrying said elements thereon, said casting including a tubular shaft journalled in a bearing in said gimbal system, wires for electrically inter-connecting the sensitive elements on said casting to utilization devices on said vehicle, said wires pasing through said tubular shaft, said sensitive elements including three accelerometers oriented in mutually perpendicular directions, a pair of two degree of freedom gyroscopes, the spin axis of one of said gyroscopes being perpendicular to a plane in which the spin axis of the other of said gyroscopes lies, the spin axis of said one gyro being parallel to one of said accelerometers and the spin axis of said other gyro being inclined to the axes of the other accelerometers.

3. In an inertial guidance system for a vehicle, a platform for supporting the sensitive elements thereof in constant attitude in inertial space including a rigid casting mounted in a gimbal system on said vehicle and carrying said elements thereon, said casting including a tubular shaft journalled in a bearing in said gimbal system whereby said casting is rotatable within said gimbaling system about an axis collinear with the axis of said tubular shaft, wires for electrically inter-connecting the sensitive elements on said casting to utilization devices on said vehicle, said wires passing through said tubular shaft, a flange carried on a shaft, said shaft being journalled in said casting for rotation about an axis concentric with the axis of rotation of said casting in said gimbaling system, pickoff means between said shaft and said casting and optically reflecting means carried by said flange.

4. In an inertial guidance system for a vehicle, a platform for supporting the sensitive elements thereof in constant attitude in inertial space including a rigid casting mounted in a gimbal system on said vehicle and carrying said elements thereon, said casting including a tubular shaft journalled in a bearing in said gimbal system whereby said casting is rotatable within said gimbaling system about an axis collinear with the axis of said tubular shaft, wires for electrically inter-connecting the sensitive elements on said casting to utilization devices on said vehicle, said wires passing through said tubular shaft, said sensitive elements including three accelerometers oriented in mutually perpendicular directions, a flange carried on a shaft, said shaft being journalled in said casting for rotation about an axis concentric with the axis of rotation of said casting in said gimbaling system, pickoff means between said shaft and said casting and optically reflecting means carried by said flange.

5. In an inertial guidance system for a vehicle, a platform for supporting the sensitive elements thereof in constant attitude in inertial space including a rigid casting mounted in a gimbal system on said vehicle and carrying said elements thereon, said casting including a tubular shaft journalled in a bearing in said gimbal system whereby said casting is rotatable within said gimbaling system about an axis collinear with the axis of said tubular shaft, wires for electrically inter-connecting the sensitive elements on said casting to utilization devices on said vehicle, said wires passing through said tubular shaft, said sensitive elements including three accelerometers oriented in mutually perpendicular directions, a pair of two degree of freedom gyroscopes, the spin axis of one of said gyroscopes being perpendicular to a plane in which the spin axis of the other of said gyroscopes lies, the spin axis of said one gyro being parallel to one of said accelerometers and the spin axis of said other gyro being inclined to the axes of the other accelerometers, a flange carried on a shaft, said shaft being journalled in said casting for rotation about an axis concentric with the axis of rotation of said casting in said gimbaling system, pickoff means between said shaft and said casting and optically reflecting means carried by said flange.

6. In an inertial guidance system for a vehicle, a platform for supporting the sensitive elements thereof in constant attitude in inertial space including a rigid casting mounted in a gimbal system on said vehicle and carrying said elements thereon, said casting including a tubular shaft journalled in a bearing in said gimbal system whereby said casting is rotatable within said gimbaling system about an axis collinear with the axis of said tubular shaft, wires for electrically inter-connecting the sensitive elements on said casting to utilization devices on said vehicle, said wires passing through said tubular shaft, said sensitive elements including three accelerometers oriented in mutually perpendicular directions, a pair of two degree of freedom gyroscopes, the spin axis of one of said gyroscopes being perpendicular to a plane in which the spin axis of the other of said gyroscopes lies, the spin axis of said one gyro being parallel to one of said accelerometers and the spin axis of said other gyro being inclined to the axes of the other accelerometers, a flange carried on a shaft, said shaft being journalled in said casting for rotation about an axis concentric with the axis of rotation of said casting in said gimbaling system, pickoff means between said shaft and said casting and optically reflecting means carried by said flange.

7. In a device of the character described, a frame, an inertial platform, means for mounting said platform on said frame, said mounting means including a resilient member having an X shaped cross section in which two adjacent legs are connected to said frame and the opposite two adjacent legs are connected to said platform, and tuning members attached to opposite sides of the resilient member in the crotches between the platform and the frame.

8. In a device of the character described, a frame, an inertial platform, means for mounting said platform on said frame, said mounting means including a resilient member having an X shaped cross section in which two adjacent legs are connected to said frame and the opposite two adjacent legs are connected to said platform, and tuning members attached to opposite sides of the resilient member in the crotches between the platform and the frame, said tuning members having a stiffness greater than said resilient member.

9. In a device of the character described, a frame, an inertial platform, means for mounting said platform on said frame, said mounting means including a resilient member having an X shaped cross section in which two adjacent legs are connected to said frame and the opposite two adjacent legs are connected to said platform, and tuning members attached to opposite sides of the resilient member in the crotches between the platform and the frame, said tuning members having a stiffness greater than said resilient member whereby the resonant frequency of said mount may be regulated by choosing appropriate tuning members so that the resonant mounting means prevents transmission of vibrations of said support of predetermined frequency to said platform.

References Cited by the Examiner
UNITED STATES PATENTS

| | | | |
|---|---|---|---|
| 2,430,709 | 11/1947 | Devorss | 74—5 X |
| 2,793,028 | 5/1957 | Wheeler | 74—5 X |
| 2,868,021 | 1/1959 | Sedgfield et al. | 74—5.4 |
| 2,948,157 | 8/1960 | Sedgfield | 74—5.34 |
| 2,966,744 | 1/1961 | Mueller | 74—5 X |
| 3,005,352 | 10/1961 | Claret | 74—5.22 X |

BROUGHTON G. DURHAM, *Primary Examiner.*

DON A. WAITE, MILTON KAUFMAN, *Examiners.*